C. VON HOFE.
DISTINCE MEASURING INSTRUMENT.
APPLICATION FILED NOV. 29, 1913.

1,147,990.

Patented July 27, 1915.

UNITED STATES PATENT OFFICE.

CHRISTIAN von HOFE, OF ZEHLENDORF, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

DISTANCE-MEASURING INSTRUMENT.

1,147,990.  Specification of Letters Patent.  Patented July 27, 1915.

Application filed November 29, 1913. Serial No. 803,654.

*To all whom it may concern:*

Be it known that I, CHRISTIAN VON HOFE, citizen of the German Empire, and resident of Zehlendorf, near Berlin, Germany, have invented certain new and useful Improvements in Distance-Measuring Instruments, of which the following is a specification.

The invention relates to a base line distance meter having in the image field a dividing line which is sharp in the whole of its length and formed by the limiting edge of a reflecting coating in the ocular prism device. The invention consists in a construction of a base line telemeter of this kind where the ocular axis is disposed inclined to the plane of the measuring triangle.

A further object of the invention consists in constructing such a base line telemeter with inclined direction of vision in such a manner that the images in the field of view can be reversed at will. The principal effect of such construction consists therein that the instrument can be used either for the observation of top points of distant objects or for the observation of bottom points so that either top points or bottom points of the objects contact with each other in the dividing line.

The invention is illustrated on the accompanying drawing.

Figure 1:
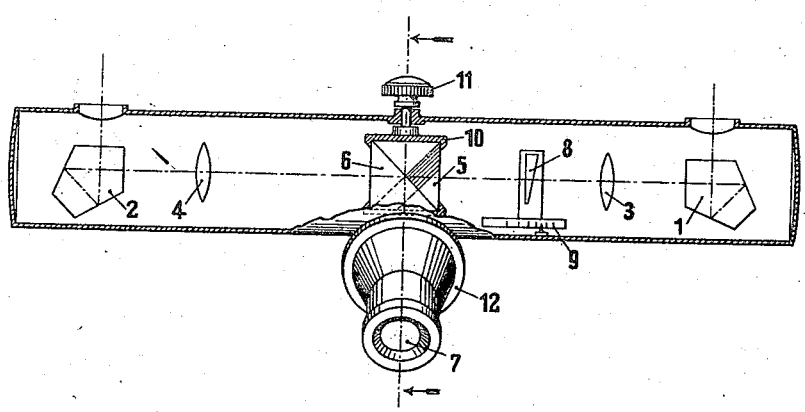
Figure 2:
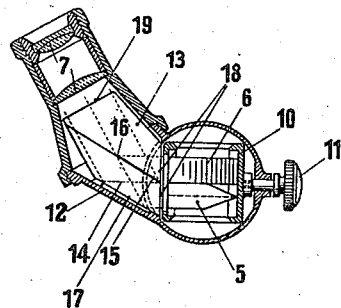

Figure 1 is a longitudinal section through an embodiment of the invention showing a part of the optical elements merely diagrammatically. Fig. 2 is a cross section through the ocular axis.

The telemeter is provided at the ends of its basis with penta prisms 1, 2. The objectives are designated 3, 4 and the image combining devices or cross prisms which are as usually arranged in front of the ocular prism proper are designated 5, 6. The prism 5 is formed as a roof edged prism whereas the prism 6 is a simple three sided rectangular prism. The ocular lenses are designated 7 and are arranged in a manner that their axis is inclined with regard to the plane of the measuring triangle.

8 is an adjustable wedge shaped member and 9 a scale plate showing the position of the wedge shaped member 8 which is characteristic for the distance of the object aimed at, the images of which contact with each other in the dividing line of the image field of the instrument.

10 is the rotatable mounting for the crossed prisms or image combining device 5, 6 having a handle or knob 11. By rotating mounting 10 with prisms 5, 6 the same can be displaced within the casing of the instrument in such a manner that prism 6 coöperates with objective 3 instead of objective 4 and prism 5 with objective 4 instead of objective 3.

12 is the inclined ocular casing containing the ocular prism proper consisting of the two prisms 13, 14 contacting with each other and having a reflecting layer 15 provided in the contact surface. The limiting edge 16 of said reflecting layer 15 is arranged parallelly to the plane of the measuring triangle and positioned in the image plane of the ocular so that it appears sharp throughout its length in the image field.

17 is the reflecting surface of prism 14.

18 is the entrance surface of the compound prism 13, 14, and 19 the exit surface. The entrance surface 18 is arranged vertically to the axis of rotation of the prism mounting 10.

The position of the crossed prisms 5, 6 shown on the drawing is preferably used if it is intended to determine the distance of objects waiving in the air such as air ships and the like. In this instance the observer perceives in the upper part of the image field an upright image of the distant object, whereas in the lower part of the image field he perceives an inverted image so that he can easily bring to coincidence by shifting the wedge shaped body 8 the bottom points of the distant objects.

If it is intended to use the instrument for measuring the distance of objects on the earth such as church towers and the like which usually have their most characteristic parts at the top side then the mounting 10 with prisms 5, 6 is turned for 180° by rotating handle 11 so that the positions of prisms 5, 6 are changed. Then the inverted images appear in the upper part of the image field and the upright images in the lower part. The observer therefore can bring to coincidence the images of the upper points of the distant objects and can therefore easily adjust the instrument on objects firmly positioned on the earth.

What I claim is:

1. In a base line telemeter an image combining device, a compound ocular prism provided with a reflecting layer in a contact surface of its elements inclined to the plane of the measuring triangle of the telemeter having a limiting edge substantially parallel to the plane of the measuring triangle and coinciding with an ocular image plane, the compound ocular prism further provided with an entrance surface for the rays, with one reflecting surface substantially parallel to said reflecting layer in the prism contact surface and with an exit surface substantially perpendicular to the rays reflected thereagainst by said reflecting layer and reflecting prism surface.

2. In a base line telemeter a reversible image combining device, a compound ocular prism immovably mounted in the casing of the instrument, and provided with a reflecting layer in a contact surface of its elements inclined to the plane of the measuring triangle of the telemeter and having a limiting edge substantially parallel to the plane of the measuring triangle and coinciding with an ocular image plane, the compound ocular prism further provided with an entrance surface for the rays, with one reflecting surface substantially parallel to said reflecting layer in the prism contact surface and with an exit surface substantially perpendicular to the rays reflected thereagainst by said reflecting layer and reflecting prism surface.

In testimony whereof I have signed this specification in the presence of two subscribing witnesses.

CHRISTIAN von HOFE.

Witnesses:
WOLDEMAR HAUPT,
HENRY HASPER.

Copies of this patent may be obtained for five cents each, by addressing the "Commissioner of Patents, Washington, D. C."